United States Patent Office 3,547,664
Patented Dec. 15, 1970

3,547,664
REFRACTORY RAMMING MIX
Pablo V. Salazar, Chicago, Ill., assignor to Nalco Chemical Company, Chicago, Ill., a corporation of Delaware
No Drawing. Filed Dec. 13, 1967, Ser. No. 690,100
Int. Cl. C04b 35/10
U.S. Cl. 106—65
5 Claims

ABSTRACT OF THE DISCLOSURE

A refractory ramming mix composition comprising at least 60% alumina, a phosphoric acid binder and containing ceramic fibers and a method of forming a monolithic refractory surface which is resistant to abrasion and erosion at temperatures in excess of 2,000° F.

INTRODUCTION

Refractory ramming mixes and monolithic linings for furnaces, hot metal ladles and other applications are well-known to the refractory art. In many instances, particularly in the ferrous metal processing industries, it has been found that ramming mixes having a high alumina content are particularly useful in high temperature applications where erosion, abrasion and slag attack are particularly severe.

Ramming mixes, which utilize a relatively high percentage of alumina with other refractory materials in a granular combination with a certain amount of clay have been well-known to the art. These ramming mixes have commonly included phosphoric acid or an aluminum phosphate as a binder. The phosphoric acid binder is useful in reacting with granular alumina to form a chemical bond at temperatures below those which are necessary to form a ceramic bond.

Although phosphoric acid bonded high alumina ramming mixes have been commonly used in the prior art, there have been definite shortcomings in these materials. Cracking upon drying and a need for a higher strength at temperatures wherein a mix must rely upon a chemical bond are two of the biggest problems in prior art high alumina ramming mixes. A mix which would be free of cracks and have a higher strength would be very beneficial to the art. Therefore, it would be of great benefit to the art if a high alumina refractory ramming mix were available which would be capable of being dried with a minimum of cracking and which would have an improved compressive and transverse strength over the prior art mixes.

OBJECTS

An object of the subject invention is to provide a high alumina refractory ramming mix which is characterized as being easily cured with a relative freedom from cracks.

Another object of the invention is to provide a high alumina refractory ramming mix which has an improved crushing strength.

A further object of the invention is to provide a method of forming a monolithic refractory surface which is characterized as being resistant to abrasion and erosion at temperatures in excess of 2,000° F. by pneumatically ramming into place a high alumina ramming mix which is characterized as having a greatly improved strength.

A high alumina refractory ramming mix composition has been discovered which is characterized as being highly resistant to abrasion and erosion at temperatures in excess of 2,000° F. The refractory ramming mix composition is also characterized as having a cold crushing strength after drying at 230° F. and, after firing at various temperatures up to 2,900° F., which is greatly superior to any high alumina refractory ramming mixes which are known to the prior art.

In its broadest terms the refractory ramming mix composition of the subject invention comprises a mixture of at least 60% by weight of granular alumina, from about 2 to about 8% by weight of clay, a phosphoric acid binder in the form of an 85% solution of $H_3PO_4$ and from about 0.04 to about 0.50 weight percent of a ceramic fiber. Water may be added to the composition for purposes of improving the plasticity and workability. Other refractory granular materials may be added as a filler for economic reasons in less severe applications. Compositions which are within the scope of the subject invention fall within the range as shown in Table I below:

TABLE I

| | Weight percent |
|---|---|
| Alumina | 60–95 |
| Clay | 2–8 |
| Ceramic fiber | 0.04–0.50 |
| Phosphoric acid (85%) $H_3PO_4$ | 3–5 |
| Water | 3–5 |
| Other refractory granular materials | 0–20 |

The alumina, which is a component in the composition of the subject invention, is a granular processed alumina which is relatively pure $Al_2O_3$. The alumina may be in the form of tabular alumina or calcined alumina. The tabular alumina is an alumina form which has been densified by heating over a period of time at a high temperature. Tabular alumina is a well-known item of commerce and the process by which it is formed will not be described in detail here, as it is not essential to the subject invention.

Calcined alumina is another processed form of alumina which is not as dense as tabular alumina and which has not been subjected to as severe a heat-treating process as tabular alumina. Calcined alumina is normally not commercially available in the coarser grained sizes; therefore, the most preferred refractory mix contains a mixture of tabular alumina and calcined alumina.

In the most preferred embodiment of the subject invention, tabular alumina is mixed with calcined alumina in a ratio of at least 2 to 1 by weight. The tabular alumina is in the form of relatively coarse particles of a size equal to about a 10 mesh by the U.S. Standard Sieve series. The calcined alumina is in the form of a relatively fine powder of a size substantially all finer than 200 mesh. Although finely ground tabular alumina is available commercially and can be used in place of the calcined alumina, the calcined alumina is preferred for economic reasons.

A certain amount of clay is essential to the refractory ramming mix composition of the subject invention to provide the plasticity and workability which is needed for ramming. The clay which is referred to as being useful in the composition can be any one of a number of plastic clays which are available commercially. A Georgia kaolin clay has been used as a preferred material; however, it is not intended to limit the scope of the subject invention to any particular clay, as any of a wide range of plastic clays can be utilized. It has been found that at least 2% of clay must be present in the mix to give it the necessary plasticity and workability for ramming; however, it has also been found that more than 8% of a clay is undesirable, as it tends to minimize the effects of the ceramic fibers and to lower the abrasion and erosion resistance at temperatures in excess of 2,000° F.

It is the use of the ceramic fibers which imparts unique characteristics to the ramming mix and results in a mix of greatly improved crushing strength. A wide range of ceramic fibers have been found to be useful in contributing these unique properties to the ramming mix; however, the weight percent of the ceramic fibers to the total composition has been found to be critical. Most particularly, the ratio of the weight percent of the clay which is present in the mix to the weight percent of the ceramic fiber which is present in the mix has been found to be critical. It has been found that the ceramic fibers should be present in the mix in an amount which is equal to from about 2% by weight to about 6% by weight of the clay which is present in the mix. Most preferably, the ceramic fibers should be present in an amount equal to about 4% by weight of the clay which is present in the mix.

The fibers which are useful in the subject invention are selected from a great variety of short ceramic fibers which are available commercially. It is desirable to use fibers which have a minimum of organic material associated with them; however, fibers having a certain amount of organic coating can also be used.

Because of the number of different ceramic fibers which have been tested and found to be beneficial in the mix of the subject invention, it has been indicated that the particular composition of the ceramic fiber is not critical. Rather, it is the percentage of fibers present in the mix and the physical characteristic of the fibers which is important.

The fibers which are useful in the subject mix should be of a physical configuration so that they are at least three times as long in the longitudinal direction as in the transverse direction; or, in other words, their length should be at least three times their diameter. The fibers, to be used in the mix of the subject invention, should be no longer than 3/8 inch, and, more preferably should be less than 1/4 inch in length. Most preferably, the fibers for use in the subject invention should be no longer than 1/16 inch.

The fibers which are useful in the composition of the subject invention are readily available as items of commerce. Fiberglass has been used in a form which is coated with a resin and in a form in which the resin has been burned off. Short fiber asbestos and a milled ceramic insulating wool have also proven to be useful in the subject invention.

Fiberglass fibers are available as "milled fibers" from fiber glass manufacturers. Asbestos shorts are readily available from miners and processors and other suitable fibers can be made by hammer milling spun or continuous filament fibers which are available from fiberglass manufacturers or from suppliers of ceramic wool insulation.

The ceramic wool insulation which is referred to is commonly made by a process wherein a glassy ceramic melt is blown through orifices to form a ceramic, fibrous, wooly mass. Various other processes for manufacturing fiber glass, ceramic wool and other ceramic fibers are well-known to the art. The particular process by which the fibers are manufactured is not essential to the subject invention. It is merely necessary that the fibers which are used be of the configuration described above.

The other refractory granular materials which are referred to as being useful as filler material in ramming mixes within range of compositions outlined above are relatively inert granular refractory materials. The materials which are particularly useful are those selected from the group consisting of kyanite, mullite, calcined fire clay, and ground fire brick or alumino-silicate brick. In other words, any of the relatively inert and non-plastic granular alumino-silicate materials may be used.

These other refractory granular materials may be used to replace a portion of the coarse tabular alumina or of the fine calcined alumina. Most prerefably, these materials are used in an intermediate size between about 35 and about 80 mesh by the U.S. Standard Sieve series.

In a greatly preferred embodiment of the subject invention, the granular refractory material which is used is kyanite. A typical compostiion of this preferred embodiment is shown in Table II below.

TABLE II

| | Weight percent |
|---|---|
| Tabular alumina (6 mesh) | 60 |
| Calcined alumina (−325 mesh) | 28 |
| Kyanite (48 mesh) | 5 |
| Kaolin clay | 3 |
| Phosphoric acid (85%) $H_3PO_4$ | 4 |
| Ceramic fiber | 0.12 |
| Water | 4 |

The most preferred ceramic fibers for use in the composition of the specific embodiment, as shown in Table II, are short fiber asbestos and milled fiberglass. The fibers for use in the composition of this embodiment are preferably of a length of 1/16 inch or less and, most preferably, of a length of approximately 1/32 inch.

The ramming mix of the subject invention can be formed into a monolithic lining by ramming or pounding it into place in its moist form and subsequently driving off the moisture by heating. The ramming is most preferably accomplished by means of pneumatic hammers but it can be achieved by other suitable means, as long as the mix is rammed to its optimum density. The optimum density of a typical ramming mix of the subject invention such as the one shown in Table II above is approximately 190 pounds per cubic foot.

It has been discovered that this density can be obtained by ramming the composition of the subject invention with pneumatic hammers with much greater ease than with prior art mixes. Prior art high alumina ramming mixes with phosphoric acid binders are difficult to ram to their optimum density, as the tend to become thixotropic and undergo plastic flow after repeated ramming. With the ramming mixes of the subject invention, ramming to the optimum density of the mix can be achieved without having the material show any plastic flow or turn to the consistency of a stiff jelly, as do prior art high alumina, phosphoric acid bonded ramming mixes.

After ramming the composition of the subject invention to its optimum density, the finished monolithic refractory lining is achieved by drying the material. Most preferably, the rammed material is dried for approximately 18 hours at atmospheric conditions. After drying in air, the rammed surface is heated up at a rate of from about 50° F. per hours for thick section to about 100° F. per hour for thinner sections. This heating rate is continued up to approximately 1000° F. After 1000° F. is reached, the rammed monolithic surface is heated at a rate of about 150° F. per hour until the operating temperature at which the mix is to be used is reached.

The invention will be better understood with reference to the following examples:

EXAMPLE I

Two experimental phosphate bonded high alumina ramming mixes were manufactured having the compositions as shown in Table III below.

TABLE III

| | Mix A | Mix B |
|---|---|---|
| Composition; materials: | | |
| T-60 Alumina, CM, percent | 60 | 60 |
| A-2 Alumina, 325M, percent | 28 | 28 |
| Raw kyanite, 48M, percent | 5 | 5 |
| Kaolin clay, crude, air floated, percent | 3 | 3 |
| Phosphoric acid, 85% concentration, percent | 4 | 4 |
| Fiberglas, uncoated, percent added | 0.12 | |

The materials were blended in a Muller mixer, rammed into test samples with a laboratory rammer and air-dried. Samples from both of the mixes, A and B, had a density after drying of from 193 to 195 pounds per cubic foot. Samples, in the form of 2½ inch cubes which were cut from 9 inch by 2½ inch by 2½ inch in rammed specimens were then dried in an oven 230° F. and fired at 1000°, 1500°, 2000°, 2500° and 2900° F. A group of the samples which were dried at 230° F., and which were fired to each of the aforementioned temperatures, were allowed to cool to room temperature and tested for cold crushing strength. A comparison of the cold crushing strength of the various samples after drying or firing to the aforementioned temperatures as listed below in Table IV.

TABLE IV

| | Mix A | Mix B |
|---|---|---|
| Cold crushing strength, p.s.i., after— | | |
| 230° F. drying | 7,900 | 4,700 |
| 1,000° F. firing | 9,000 | 10,900 |
| 1,500° F. firing | 10,000 | 11,700 |
| 2,000° F. firing | 19,200 | 16,700 |
| 2,500° F. firing | 23,000 | 16,000 |
| 2,900° F. firing | 19,600 | 18,900 |

It can be readily seen that the cold crushing strengths which were achieved with Mix A, which contained 0.12 weight percent of uncoated fiberglass, was superior to the crushing strengths of samples of Mix B, which contained no fibrous material.

EXAMPLE II

A quantity of a high alumina ramming mix, which corresponded to ap referred mix of the subject invention corresponding to Mix A, of Example I above, was blended in a Muller Mixer and tested against a commercially available phosphoric acid bonded 90% alumina ramming mix. A comparison of the grain-size distribution of Mix A and the typical prior art mix, Mix X, are given in Table V below:

TABLE V

| | Percent | |
|---|---|---|
| Mix | Mix X | Mix A |
| Held on 6 mesh | 0.9 | 0.2 |
| Pass 6 mesh, held on 12 mesh | 28.6 | 27.7 |
| Pass 12 mesh, held on 30 mesh | 17.6 | 20.1 |
| Pass 30 mesh, held on 70 mesh | 7.7 | 8.5 |
| Pass 70 mesh, held on 100 mesh | 2.0 | 2.8 |
| Pass 100 mesh, held on 200 mesh | 2.7 | 3.0 |
| Pass 200 mesh, held on 325 mesh | 0.9 | 1.2 |
| Pass 325 mesh | 39.6 | 36.5 |

Test samples of the mix of the subject invention, Mix A, and the typical prior art mix, Mix X, were formed by ramming with a laboratory rammer. The physical properties of the rammed samples, were determined and are shown in Table VI below.

TABLE IV

| | Percent | |
|---|---|---|
| | Mix A | Mix X |
| Bulk density, p.c.f., after— | | |
| Emplacement by ramming, air dried | 193 | 190 |
| Air dried at 230° F | 184 | 179 |
| Fired at 1,000° F | 183 | 177 |
| Fired at 1,500° F | 183 | 177 |
| Fired at 2,000° F | 183 | 177 |
| Fired at 2,500° F | 183 | 177 |
| Fired at 2,900° F | 183 | |
| Moisture content as emplace, percent | 5.97 | 6.98 |
| Cold crushing strength, p.s.i., after— | | |
| Air dried at 230° F | 7,900 | [1] 4,700 |
| Fired at 1,000° F | 9,000 | [1] 11,000 |
| Fired at 1,500° F | 10,000 | [1] 15,700 |
| Fired at 2,000° F | 19,000 | [1] 17,100 |
| Fired at 2,500° F | 23,000 | [1] 16,900 |
| Fired at 2,700° F | 19,300 | [1] 18,800 |
| Fired at 2,900° F | 19,600 | [1] 9,800 |
| Modulus of rupture, p.s.i., after— | | |
| Air dried at 230° F | 1,400 | [1] 2,000 |
| Fired at 1,000° F | 1,800 | [1] 2,700 |
| Fired at 1,500° F | 1,900 | [1] 3,500 |
| Fired at 2,000° F | 2,900 | [1] 2,750 |
| Fired at 2,500° F | 2,900 | [1] 2,850 |
| Fired at 2,900° F | [1] 1,300 | [1] 1,600 |
| Linear change after firing, percent— | | |
| At 1,000° F | −1.04 | −1.22 |
| At 2,000° F | −1.30 | −1.35 |
| At 2,500° F | −1.18 | −2.05 |
| At 2,900° F | −1.23 | −2.50 |
| Apparent porosity, percent, after— | | |
| 1,000° F | 16.5 | 19.5 |
| 2,000° F | 18.5 | 24.0 |
| 2,500° F | 18.5 | 23.5 |

[1] Small surface crazing noted.

It can be seen from the physical properties of the mix of the subject invention as compared with the typical prior art mix that a higher cold crushing strength is attained at temperatures over 2000° F. with the mix of the subject invention. This is a great advance in the art, as high alumina ramming mixes are most commonly useful and needed at temperatures over 2000° F.

It was also noted that the typical competitive mix suffered from surface crazing or cracking upon drying and firing. The freedom form this surface crazing and cracking in the mix of the subject invention is a characteristic which apparently is contributed by the presence of the ceramic fibers and which results in a greatly improved resistance to erosion and abrasion in service.

It is also noted that although both the prior art mix and the mix of the subject invention shrank during firing, the shrinkage was much less with the mix of the subject invention. This lower shrinkage upon firing is a desirable property as it minimizes the danger of cracking in a monolithic wall such as a furnace lining. Lower shrinkage also results in a monolithic surface which is much more resistant to erosion, abrasion and other types of attack than a surface which suffered a greater shrinkage and pulled away from the surface upon which it was rammed.

EXAMPLE III

A series of compositions were blended in a Muller Mixer to form high alumina ramming mixes. The only difference between the mixes was the presence or absence of ceramic fibrous material and the type of ceramic fibrous material which was included. The compositions of the various mixes are shown in Table VII below:

TABLE VII

| | Percent | | | | | |
|---|---|---|---|---|---|---|
| | 0 | 1 | 2 | 3 | 4 | 5 |
| T-60 Alumina 6 mesh | 60 | 60 | 60 | 60 | 60 | 60 |
| A-2 Alumina −325 mesh | 28 | 28 | 28 | 28 | 28 | 23 |
| 48 mesh kyanite | 5 | 5 | 5 | 5 | 5 | 8 |
| Kaolin clay | 3 | 3 | 3 | 3 | 3 | 9 |
| 85% H₃PO₄ | 4 | 4 | 4 | 4 | 4 | 4 |
| ½"-.039 fiberglass | | 0.12 | | | | |
| ½"-709 Type A | | | 0.12 | | | |
| Burned pouring wool | | | | | | 0.12 |
| Unburned pouring wool | | | | 0.12 | | |
| Asbestos shorts | | | | | 0.12 | |
| Water | 4 | 4 | 4 | 4 | 4 | 4 |

Samples of each of the compositions as shown in Table VII above were rammed with a laboratory rammer to form cylinders of two inches in diameter and of uniform height. Groups of the cylinders were dried at 230° F., and fired to 1500° F., 2000° F., and 2700° F. respectively. Five samples were taken from each temperature treatment and measured for bulk density and cold crushing strength. The results of these measurements are shown in Table VIII below:

TABLE VIII

[Cold crushing strength: (p.s.i.) ave.<5 samples> bulk density-lbs./ft.³ ave.]

| | 230° F. | 1,500° F. | 2,000° F. | 2,700° F. | | 230° F. | 1,500° F. | 2,000° F. | 2,700° F. |
|---|---|---|---|---|---|---|---|---|---|
| 0 | 3,590 | 6,640 | 9,700 | 9,930 | 0 | 185 | 182 | 184 | 183 |
| 1 | 5,580 | 5,950 | 10,640 | 12,800 | 1 | 183 | 182 | 183 | 183 |
| 2 | 5,860 | 7,860 | 11,000 | 13,850 | 2 | 184 | 183 | 183 | 182 |
| 3 | 5,700 | 8,560 | 10,710 | 12,300 | 3 | 184 | 183 | 184 | 184 |
| 4 | 4,032 | 6,318 | 10,610 | 11,600 | 4 | 184 | 181 | 183 | 183 |
| 5 | 5,470 | 6,970 | 9,970 | 11,300 | 5 | 185 | 183 | 183 | 183 |

It can readily be seen from the data in Table VIII that the mixes tested were of a similar composition, and were rammed uniformly, so that they were all at nearly the same bulk density. The only difference in the compositions was the presence of the ceramic fiber. It can be seen that this difference of the addition of ceramic fiber made a great difference in the cold crushing strength of the samples after treatment at various temperatures.

The samples containing the ceramic fiber showed a marked increase in strength after treatment at the various temperatures. It can be seen that the fiberglass with the organic coating experienced a slightly lower strength after firing to 1500° F. This slightly lower strength is attributed to the burn-off of the organic material; however, it is noted that the strength rose sharply between 1500° F. and 2000° F. and the strength at the higher temperatures were markedly improved over the strength of a similar composition which contained no fibrous material.

It can also be seen that Mix No. 4, which contained asbestos shorts, did not show as high a strength as did the mixtures which contained processed ceramic fibers. This lower strength where the asbestos was used can probably be attributed to the water of hydration which is normally associated with asbestos. In fact, the water of hydration, which is normally associated with asbestos, would be expected to have a very deleterious effect upon both the fired bulk density and the cold crushing strength of a typical high alumina refractory.

It has been shown that the phenomena which has been discovered, that a small percentage of fibrous material of the requisite size greatly improves the strength of a high alumina refractory ramming mix which is bonded with phosphoric acid, has a stronger effect upon the finished refractory than any deleterious effect which is contributed by the water of hydration which is associated with the asbestos or the organic coating on some fiberglass.

CONCLUSION

It can be seen by the foregoing examples that the object of the subject invention, to provide a refractory ramming mix composition which is characterized as being of improved strength and highly resistant to abrasion and erosion at temperatures in excess of 2000° F. has been substantially achieved. The object of the invention, to provide a method of forming a monolithic refractory surface which is characterized as being resistant to abrasion and erosion at temperatures in excess of 2000° F. has also been achieved.

The invention is hereby claimed as follows:

1. A refractory ramming mix composition consisting essentially of:

| | Weight percent |
|---|---|
| Alumina | 60–95 |
| Clay | 2–8 |
| Ceramic fiber | 0.04–0.50 |
| Phosphoric acid (85%) $H_3PO_4$ | 3–5 |
| Water | 3–5 |
| Non-plastic granular alumino silicate materials | 0–20 | the ramming mixing being characterized as being highly abrasion and erosion resistant at temperatures in excess of 2,000° F.

2. The composition of claim 1 in which the other granular refractory material is kyanite.

3. The composition of claim 1 in which the fiber is at least one member of the group consisting of asbestos, milled fiberglass, and ceramic wool.

4. A refractory ramming mix composition consisting essentially of:

| | Weight percent |
|---|---|
| Tabular alumina (6 mesh) | 60 |
| Calcined alumina (−325 mesh) | 28 |
| Kyanite (48 mesh) | 5 |
| Kaolin clay | 3 |
| Phosphoric acid (85%) $H_3PO_4$ | 4 |
| Ceramic fiber | 0.12 |
| Water | 4 | the ramming mixing being characterized as being highly abrasion and erosion resistant at temperatures in excess of 2,000° F.

5. The composition of claim 4 in which the ceramic fiber is at least one member of the group consisting of asbestos, milled fiberglass, and ceramic wool.

References Cited

UNITED STATES PATENTS

| 3,197,315 | 7/1965 | Jacobs et al. | 106—65 |
| 3,284,218 | 11/1966 | King | 106—65 |
| 3,303,034 | 2/1967 | Troell et al. | 106—65 |
| 3,316,110 | 4/1967 | Herbst et al. | 106—65 |
| 3,360,594 | 12/1967 | Criss | 106—67 |

JAMES E. POER, Primary Examiner

U.S. Cl. X.R.

106—67

PO-1050
(5/69)

UNITED STATES PATENT OFFICE
CERTIFICATE OF CORRECTION

Patent No. 3,547,664          Dated December 15, 1970

Inventor(s) Pablo V. Salazar

It is certified that error appears in the above-identified patent and that said Letters Patent are hereby corrected as shown below:

Column 5, line 51, "ap referred" should read -- a preferred

Column 6, line 10, "emplace" should read -- emplaced --; in Table VII, under "5", "23" should read -- 28 --; "8" should read -- 5 --; "ς" should read -- 3 --.

Column 7, line 32, "strength" should read -- strengths --.

Signed and sealed this 30th day of March 1971.

(SEAL)
Attest:

EDWARD M. FLETCHER, JR.
Attesting Officer

WILLIAM E. SCHUYLER, JR.
Commissioner of Patents